US012721713B2

(12) United States Patent
Jürgens

(10) Patent No.: US 12,721,713 B2
(45) Date of Patent: Sep. 1, 2026

(54) DEVICE AND METHOD FOR HANDLING POULTRY ANIMALS

(71) Applicant: BIG DUTCHMAN INTERNATIONAL GMBH, Vechta (DE)

(72) Inventor: Angelika Jürgens, Hatten (DE)

(73) Assignee: BIG DUTCHMAN INTERNATIONAL GMBH, Vechta (DE)

(*) Notice: Subject to any disclaimer, the term of this patent is extended or adjusted under 35 U.S.C. 154(b) by 0 days.

(21) Appl. No.: 18/773,899

(22) Filed: Jul. 16, 2024

(65) Prior Publication Data

US 2025/0025275 A1 Jan. 23, 2025

(30) Foreign Application Priority Data

Jul. 21, 2023 (LU) ........................................ 504788

(51) Int. Cl.
*A61D 3/00* (2006.01)
*A61D 1/02* (2006.01)

(52) U.S. Cl.
CPC ............... *A61D 3/00* (2013.01); *A61D 1/025* (2013.01)

(58) Field of Classification Search
CPC .................................. A61D 1/025; A61D 3/00
See application file for complete search history.

(56) References Cited

U.S. PATENT DOCUMENTS

| | | | | | |
|---|---|---|---|---|---|
| 2,319,938 | A * | 5/1943 | Markins | A01K 37/00 | 119/714 |
| 4,758,227 | A * | 7/1988 | Lancaster, Jr. | A61D 1/025 | 604/144 |
| 6,634,319 | B1 * | 10/2003 | Zermoglio | A61D 1/025 | 119/713 |
| 8,211,058 | B2 * | 7/2012 | Jorna | A61D 1/025 | 119/713 |
| 10,350,041 | B2 * | 7/2019 | Samson | A61D 1/025 | |
| 2012/0012070 | A1 * | 1/2012 | Gorans | A01K 1/0613 | 119/713 |
| 2014/0031790 | A1 * | 1/2014 | Johnson | A61D 1/025 | 604/506 |
| 2023/0255738 | A1 * | 8/2023 | Möller | A01K 37/00 | 119/713 |

FOREIGN PATENT DOCUMENTS

| | | |
|---|---|---|
| FR | 2885030 | 11/2006 |
| WO | 2015077432 | 5/2015 |
| WO | 2017125387 | 7/2017 |
| WO | 2017125394 | 7/2017 |
| WO | 2022042995 | 3/2022 |

* cited by examiner

*Primary Examiner* — Michael H Wang
(74) *Attorney, Agent, or Firm* — PRICE HENEVELD LLP

(57) ABSTRACT

A handling device for poultry animals, in particular for supporting manual handling of poultry animals, is disclosed, along with a method for handling poultry animals, in particular manually, and the use of the handling device. The handling device includes a guide rail, extending between a first end and a second end, with two guide legs, and a poultry animal support for placing the breast area of a poultry animal thereon.

18 Claims, 11 Drawing Sheets

DEVICE AND METHOD FOR HANDLING POULTRY ANIMALS

CROSS-REFERENCE TO FOREIGN PRIORITY APPLICATION

The present application claims the benefit under 35 U.S.C. §§ 119(b), 119(e), 120, and/or 365(c) of Luxembourg Application No. LU504788 filed Jul. 21, 2023.

FIELD OF THE INVENTION

The invention relates to a handling device for poultry animals, in particular live poultry animals, a method for handling poultry animals, in particular live poultry animals, and the use of a handling device.

BACKGROUND OF THE INVENTION

Devices and methods for handling live poultry animals (and possibly for carrying out further actions) are known, for example from WO 2017/125387 A1, WO 2015/077432 A2, FR 2885030 A1, U.S. Pat. No. 10,350,041 B2, or WO 2017/125394 A1.

However, existing solutions have various disadvantages. In existing solutions, for example, the poultry animals are often placed in a forced posture, which often contradicts the natural posture of the poultry animals, such as an overhead position. In addition, the poultry animals tend to free themselves from a forced posture or do not want to adopt it. This leads to restlessness, tension, and stress in the poultry animals and also poses a risk of injury to the poultry animals. It also means that certain handling and/or actions on the poultry animals cannot be carried out or can only be carried out inadequately. In addition, a high, usually labor-intensive, effort is required to bring the poultry animals into the appropriate restraint.

However, existing systems in which the poultry animals have more freedom of movement and are transported hanging, for example, have the disadvantage that there is no clearly defined position for the poultry animals. As a result, certain handling and/or actions cannot be carried out or can only be carried out inadequately, in particular if a defined position and/or a defined counter-pressure is required.

It is therefore an object of the present invention to provide a handling device for poultry animals and a method for handling poultry animals and the use of a handling device, which reduce one or more of said disadvantages. In particular, it is an object of the present invention to provide a handling device for poultry animals and a method for handling poultry animals and the use of a handling device which improve animal welfare and/or allow improved handling and/or improved handling and/or performance of actions on the poultry animals.

SUMMARY OF THE INVENTION

This task is solved according to a first aspect by the handling device for, in particular live, poultry animals, in particular for assisting manual handling of poultry animals, comprising a guide rail, extending between a first end and a second end, with two guide legs, and a poultry animal support for placing the breast area of a poultry animal thereon.

The solution described herein is particularly suitable for live poultry animals, and the solution described herein and preferred embodiments thereof have advantages particularly in the handling of live poultry animals, such as particularly gentle handling with little stress for the animals.

The handling device has a guide rail with two guide legs, between which a poultry animal can be inserted at a first end. The poultry animal can be carried out at the second end of the guide rail or again at the first end of the guide rail. The handling device also has a poultry animal support on which the breast area of a poultry animal can be placed. In the operating state, the poultry animal support is preferably arranged below the guide rail, in particular at least partially or for the most part.

The solution described here is preferably used for the manual handling of poultry animals, wherein in particular the transportation or movement of the poultry animals in and/or through the handling device is preferably carried out purely manually.

In a preferred embodiment, it is provided that the handling device is free of transport devices for the, in particular fully or partially automatic, transport of poultry animals through the handling device, in particular from the first end to the second end, and/or into the handling device and/or out of the handling device. In particular, the handling device is free of transport elements for transporting the poultry animals along a transport direction in the longitudinal axis.

The absence of transport devices for the, in particular fully or semi-automatic, transport of poultry animals means in particular that the transport of the poultry animals is carried out manually. This embodiment is based in particular on the realization that while fully or semi-automated transport solutions may seem efficient, manual transport of live poultry animals is significantly gentler on the poultry animals and a human user can react better than an automated solution to the unexpected behavior of a poultry animal.

According to a further preferred embodiment, an activation mechanism is provided which is designed to initiate a sequence of distance changes between the guide rail and the poultry animal support, in particular in dependence of a sensor signal.

It is further preferred that the activation mechanism is designed to increase a distance between the guide rail and the poultry animal support from a functional position to a release position, in particular in the vertical direction.

Preferably, the guide rail and the poultry animal support are positioned or can be positioned relative to one another in such a way that a poultry animal can be fixed or partially fixed between the guide rail and the poultry animal support, in particular in the vertical direction. This means in particular that a poultry animal cannot escape between the guide rail and the poultry animal support, in particular in a lateral direction.

The distance between the guide rail and the poultry animal support, in particular the distance in the vertical direction, is important for positioning and (partially) fixing the poultry animals between the guide rail and the poultry animal support. The greater the distance, the more freedom of movement the poultry animal has. The activation mechanism can be used to vary this distance, in particular from a functional position, in which the distance is smaller, to a release position, in which the distance is greater.

Preferably, the activation mechanism is designed to change the distance between the guide rail and the poultry animal support in a vertical direction only. This makes for a particularly simple and robust design.

It may also be preferred that the activation mechanism has a sensor and is designed to initiate the increase and/or decrease of the distance between the guide rail and the poultry animal support in dependence of the sensor signal.

Preferably, a sensor can be provided which is preferably designed to detect the position of a poultry animal along the guide rail. Preferably, the distance between the guide rail and the poultry animal support can be varied in dependence of a sensor signal from the sensor and/or a sequence of distance changes can be initiated.

Preferably, a distance between the first end and the second end is at most 2 m, in particular at most 1.80 m, in particular at most 1.70 m, in particular at most 1.60 m, in particular at most 1.50 m, in particular at most 1.40 m, in particular at most 1.30 m, in particular at most 1.20 m, in particular at most 1.10 m, in particular at most 1.00 m. Further preferably, a base area of the handling device is at most 1.80 m×1.00 m. Further preferably, a height of the handling device, in particular of the first end and/or of the second end, is at least 0.50 m, in particular at least 0.60 m, in particular at least 0.70 m, in particular at least 0.80 m, in particular at least 0.90 m, in particular at least 1.00 m, in particular at least 1.10 m, and/or at most 1.50 m, in particular at most 1.40 m, in particular at most 1.30 m, in particular at most 1.20 m, in particular at most 1.10, in particular at most 1.00 m.

These dimensions are particularly preferred, as the handling device can be operated by one person, wherein the handling device is designed so that a person can manually insert a poultry animal into the guide rail and carry it out, preferably without changing their position.

In a preferred embodiment, it is provided that the activation mechanism is designed to reduce a distance between the guide rail and the poultry animal support from an insertion position to the functional position.

A preferred further development is characterized by the fact that the activation mechanism is designed to reduce a distance between the guide rail and the poultry animal support from a release position into the functional position and/or into the insertion position.

Preferably, the distance between the guide rail and the poultry animal support can be varied between different positions. Particularly preferred here are a functional position, in which the distance is smallest, and a release position, in which the distance is largest, and an insertion position, the distance between which lies between the functional position and the release position.

According to a preferred embodiment, it is provided that the handling device has a first functional device and preferably a second functional device.

Such functional devices can preferably be used to perform actions on the poultry animal, particularly in the functional position.

In a further preferred embodiment, it is provided that the activation mechanism is designed, in particular in dependence of the sensor signal, to initiate at least one change in distance between the guide rail and the poultry animal support and to activate at least the first and/or the second functional device. The activation mechanism can therefore preferably not only initiate and/or carry out the change in distance, but preferably also activate one or more or all functional devices, simultaneously or successively, when or after reaching the functional position.

A further preferred embodiment is characterized in that the handling device and/or the first functional device and/or the second functional device comprise a substance provision device. This is particularly advantageous if one or more substances are to be used, for example administered or applied, by the functional device(s).

It is particularly preferred that the first functional device and/or the second functional device and/or the substance provision device is/are designed as a modular exchange unit, in particular a disposable unit. An exchange of the first functional device and/or a second functional device and/or a substance provision device is particularly preferred after the handling of a plurality of poultry animals, in particular a poultry house population or a poultry house subpopulation. In this way, hygiene and safety requirements, for example to prevent the spread of diseases, can be met particularly efficiently.

Furthermore, it is preferable that the guide rail is aligned essentially horizontally. It is also preferred that the two guide legs are arranged opposite one another. Furthermore, it is preferred that a poultry animal holder is formed between the two guide legs.

A further preferred further development provides that the poultry animal support is shaped to be ergonomic for poultry animals and/or has a recess therein and/or has a breast stop.

These embodiments serve in particular to ensure that a poultry animal can be introduced particularly gently and safely between the guide legs and can be positioned and (partially) fixed particularly gently and safely between the guide rail and the poultry animal support.

Furthermore, it is preferred that the poultry animal support is arranged so as to be movable, in particular in the vertical direction, relative to the guide rail, wherein preferably the poultry animal support is arranged so as to be movable exclusively in the vertical direction relative to the guide rail. This makes for an efficient and robust design.

In a further preferred embodiment, it is provided that the guide legs are widened and/or flattened and/or rounded at a first end of the guide rail. These embodiments also serve in particular to ensure that a poultry animal can be introduced between the guide legs in a particularly gentle and safe manner.

In particular, it is preferred that the guide legs have a stop at a second end of the guide rail, in particular for the hand of a user. This has the advantage that a user can recognize how far a poultry animal is to be inserted. Preferably, the sensor of the activation mechanism is designed to detect the position of a user's hand at the stop or the position of the poultry animal when a user's hand reaches the stop, in order to then preferably activate the functional position and, if applicable, the functional device(s).

Furthermore, it is preferred that a preferably flexible, hold-down device is arranged between the guide legs and/or in the poultry animal holder. This hold-down device can be used to ensure that the poultry animal adopts a certain body posture, in particular a head posture. This can be advantageous for certain handling operations. In particular, it is advantageous if the hold-down device is arranged at the position of the second functional device. The hold-down device can, for example, be designed as a rubber lip, brush, and/or thread curtain.

In a further preferred embodiment, it is provided that the handling device has a mobile chassis, in particular a chassis with rollers, preferably at least two rollers, in particular at least three rollers, preferably exactly four rollers. This makes it easy to move the handling device to different barns and parts of the barn. The chassis can have a drive to move the handling device between different locations. The chassis can have a braking and/or locking device.

Preferably, essential elements of the handling device, in particular the guide rail and/or the functional device(s) and/or the activation mechanism and/or the substance provision device(s) are arranged within the chassis, in particular laterally within the chassis and/or not protruding laterally.

A further preferred further development provides for the first functional device to comprise a needle arrangement, preferably adjustable in height, which preferably comprises at least two needle generators for one, two, or more needles in each case. Preferably, the needle generators are arranged symmetrically with respect to a longitudinal axis and/or at an angle to the vertical and/or a vertical plane encompassing the longitudinal axis of at least 15 degrees and/or at most 25 degrees.

With such a needle arrangement, breast vaccination of poultry animals can be advantageously carried out with a vaccine substance.

In a further preferred embodiment, it is provided that the second functional device has a needle, preferably arranged essentially horizontally. The needle is preferably arranged on the guide rail, in particular on one of the two guide legs. The needle is also preferably arranged to puncture the skin of a poultry animal placed on the poultry animal support, in particular in the area of the inside of the wing. Furthermore, the needle is preferably arranged above the flexible hold-down device. The second functional device can preferably be used to vaccinate poultry animals with a smallpox vaccine.

In a further preferred embodiment, it is provided that the handling device comprises a structure for a wing vaccination having a drive mechanism designed to move a needle forwards and backwards, in particular within a horizontally aligned plane. Preferably, this structure comprises two sections, namely a first section and a second section. Preferably, the first section of the structure has a drive mechanism which is designed to move a needle back and forth, in particular within a horizontally aligned plane. Preferably, such a needle can be pushed from behind into a tube of the drive mechanism and locked to it. The tube is preferably moved by a crank drive and is preferably sealed to the outside so that dirt can be prevented from entering the drive mechanism. Preferably, a cartridge, preferably made of plastic, can be attached to the drive mechanism, to which, for example, a vaccine can be attached. Such a vaccine is preferably additionally removed from an operator's hand area by the cartridge, so that improved operator safety can be achieved. Preferably, the vaccine flows within the cartridge via a channel to the tip of a needle and wets it. Preferably, a further tube, preferably located in the region of the second section, can be extended on the opposite side of the needle, whereby this further tube can preferably form a counter-pressure point to the needle so that a wing skin of the poultry animal can be pierced more easily. The entire structure of the wing vaccination can preferably be moved along the direction of insertion of the poultry animal. This means that the needle position can preferably be adapted to the anatomy of the individual poultry animal in a particularly advantageous way.

According to a further aspect of the invention, the above-mentioned problem is solved by a method for, in particular manual, handling of poultry animals, in particular live poultry animals, preferably in a handling device, in particular in a handling device described above. The method comprises: Inserting a poultry animal between two guide legs of a guide rail and placing the breast area of the poultry animal on a poultry animal support, increasing a distance between the guide rail and the poultry animal support from a functional position to a release position, in particular in the vertical direction, preferably by means of an activation mechanism.

The method is preferably further characterized in that, when the poultry animal is inserted between two guide legs of a guide rail, the distance between the guide rail and the poultry animal support corresponds to an insertion position, and the distance between the guide rail and the poultry animal support is reduced from the insertion position to the functional position after the poultry animal has been inserted, in particular in dependence of a sensor signal.

The method is preferably further characterized in that before the distance between the guide rail and the poultry animal support is increased from the functional position to the release position, at least one first functional device is activated.

The method is further preferably characterized by exchanging the first functional device and/or a second functional device and/or a substance provision device after handling a plurality of poultry animals, in particular a poultry house population or a poultry house subpopulation, preferably as a modular exchange unit, in particular a disposable unit.

According to a further aspect of the invention, the above-mentioned problem is solved by using a previously described handling device for handling, in particular live, poultry animals, preferably in or in front of a poultry house and/or in a previously described method.

With regard to the advantages, preferred embodiments and details of the individual aspects and their preferred embodiments, reference is also made to the corresponding advantages, preferred embodiments and details described with reference to the respective other aspects.

Further advantageous embodiments result from the combination of individual, several or all of the preferred features described here.

BRIEF DESCRIPTION OF THE DRAWINGS

Preferred embodiments are described by way of example with reference to the accompanying figures. They show.

DETAILED DESCRIPTION OF THE EMBODIMENTS

Figure 1:
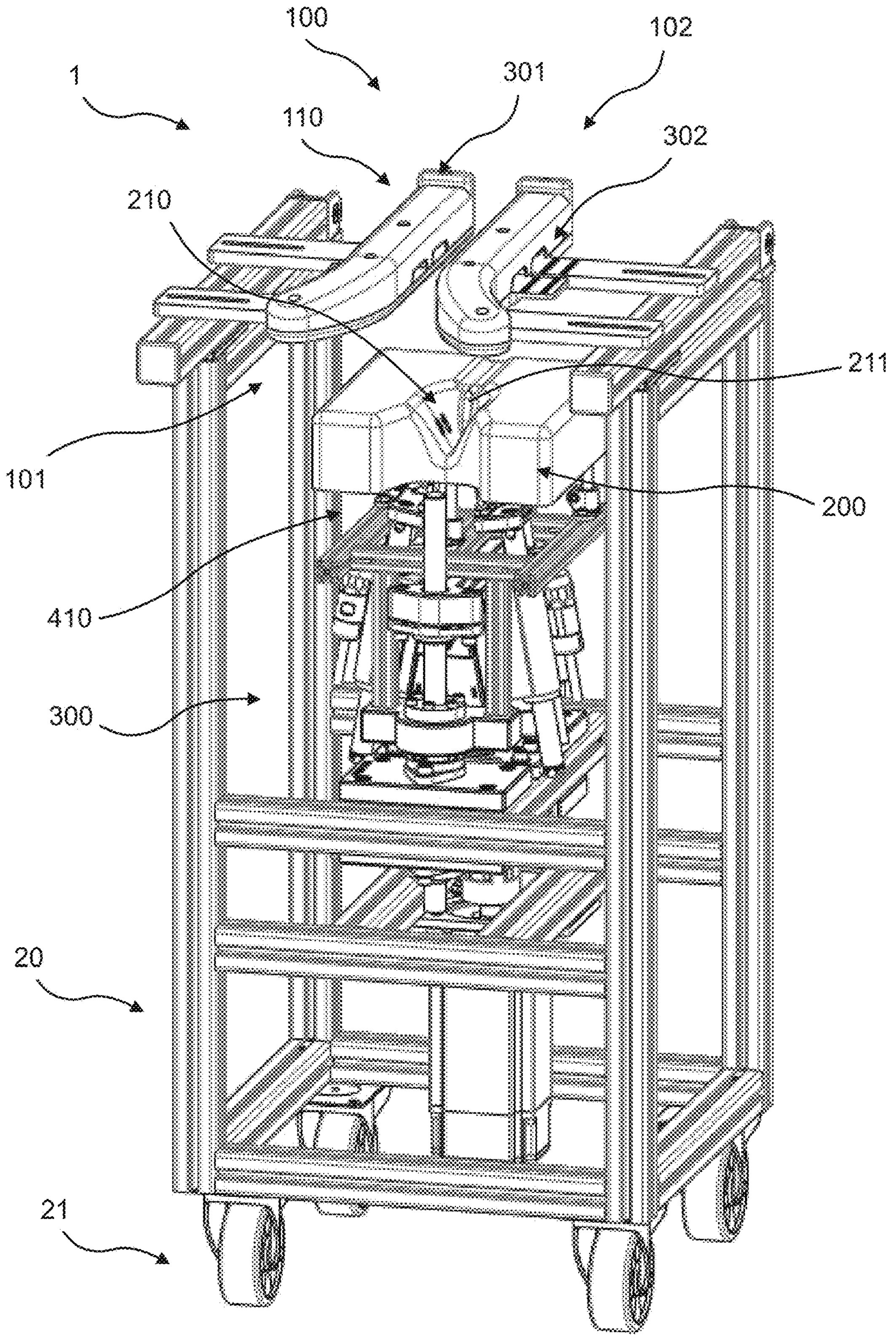
FIG. 1 is a schematic three-dimensional representation of an exemplary handling device.
Figure 2:
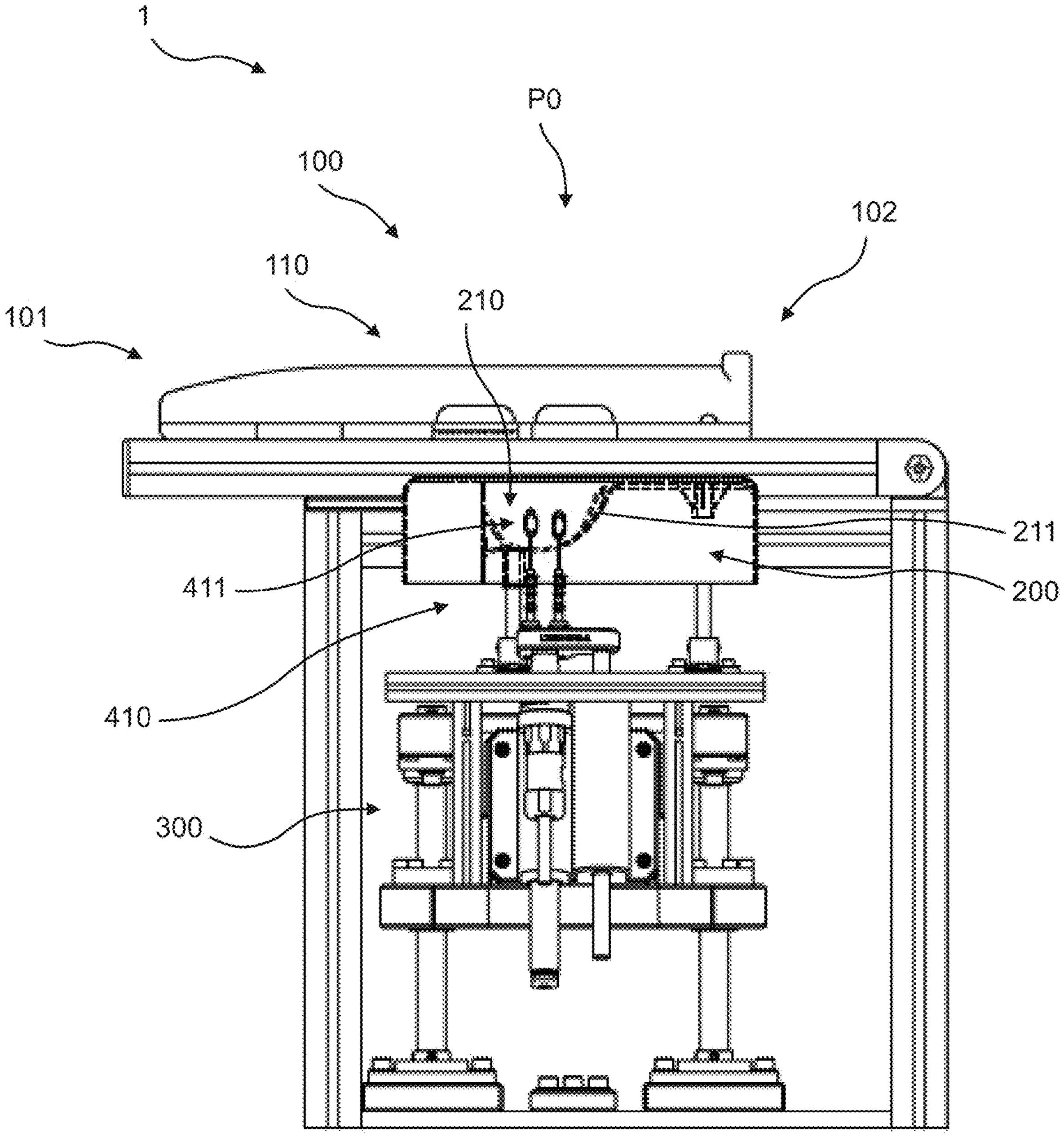
FIG. 2 is a side view of the handling device according to FIG. 1 in an insertion position.
Figure 3:
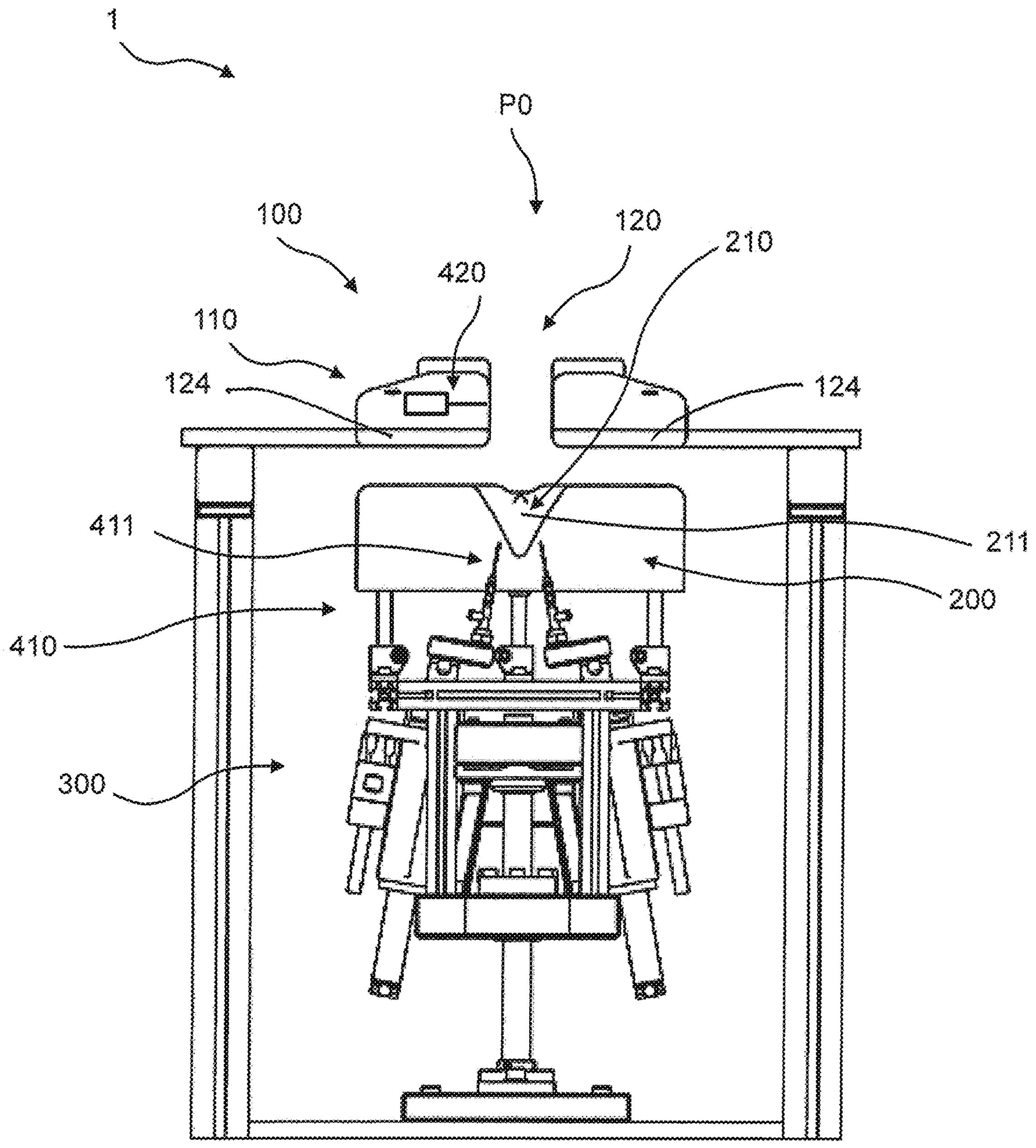
FIG. 3 is a front view of the handling device according to FIG. 1 in the insertion position.
Figure 4:
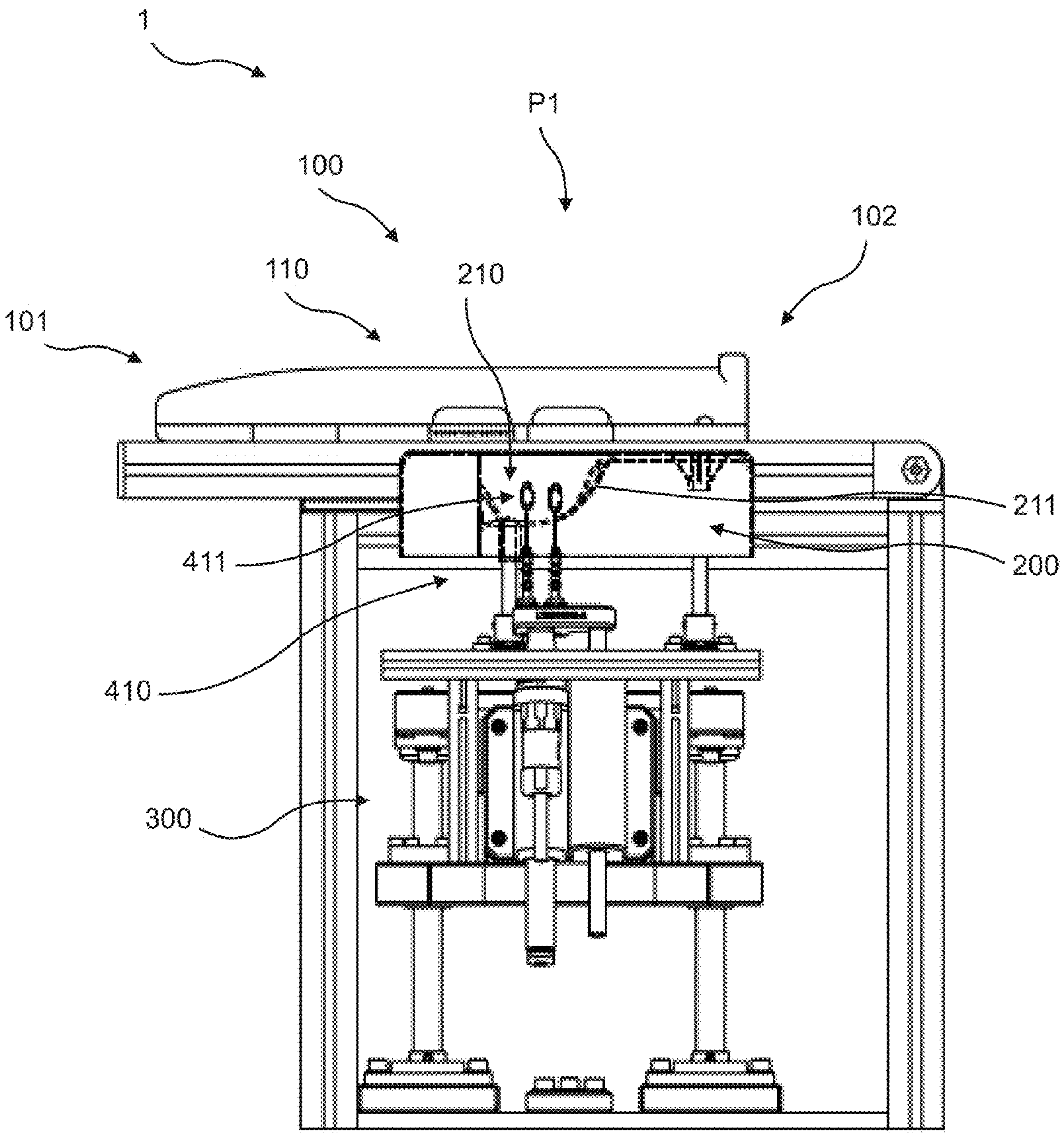
FIG. 4 is a side view of the handling device according to FIG. 1 in a functional position with the functional devices retracted.
Figure 5:
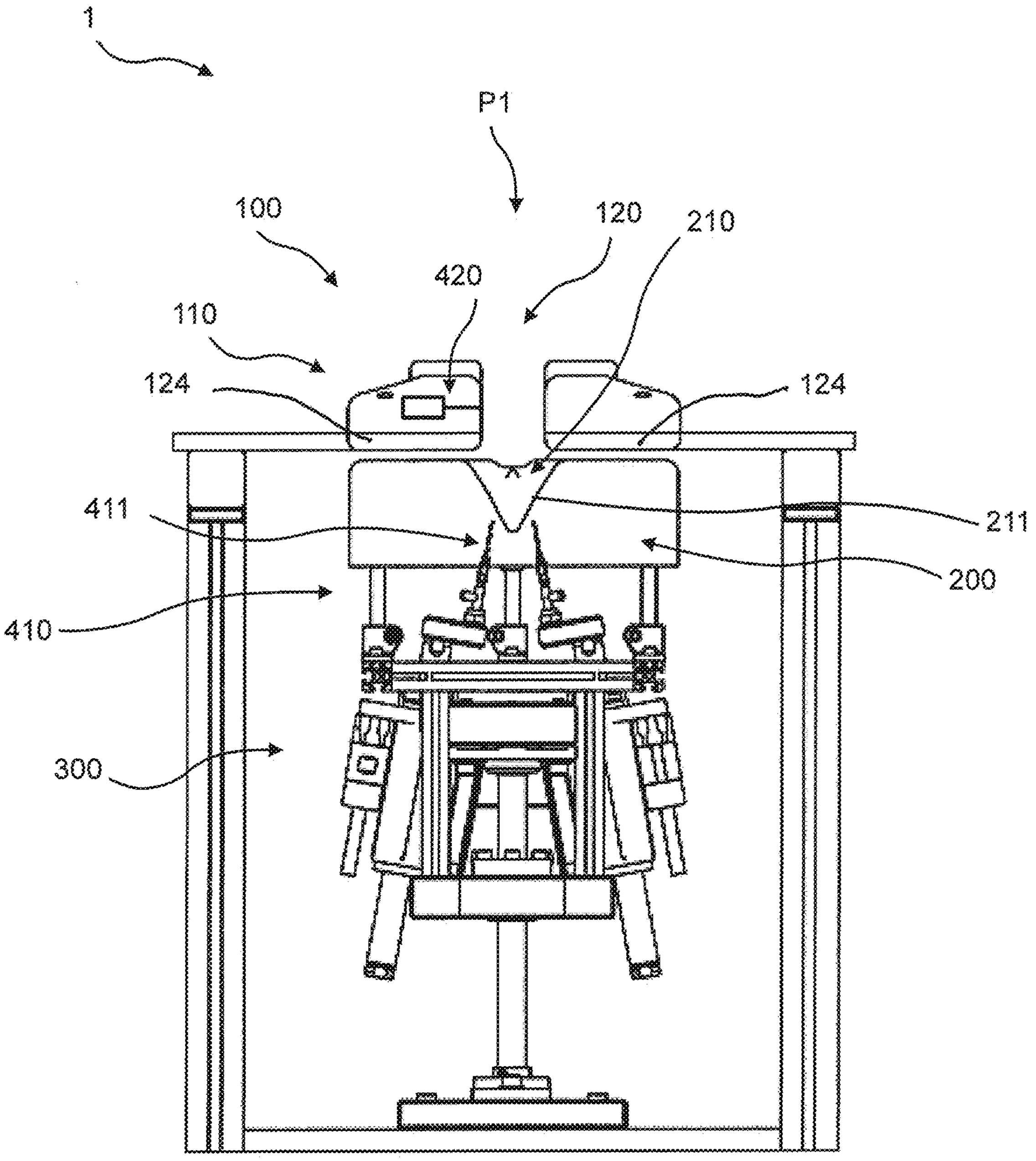
FIG. 5 is a front view of the handling device according to FIG. 1 in the functional position with the functional devices retracted.
Figure 6:
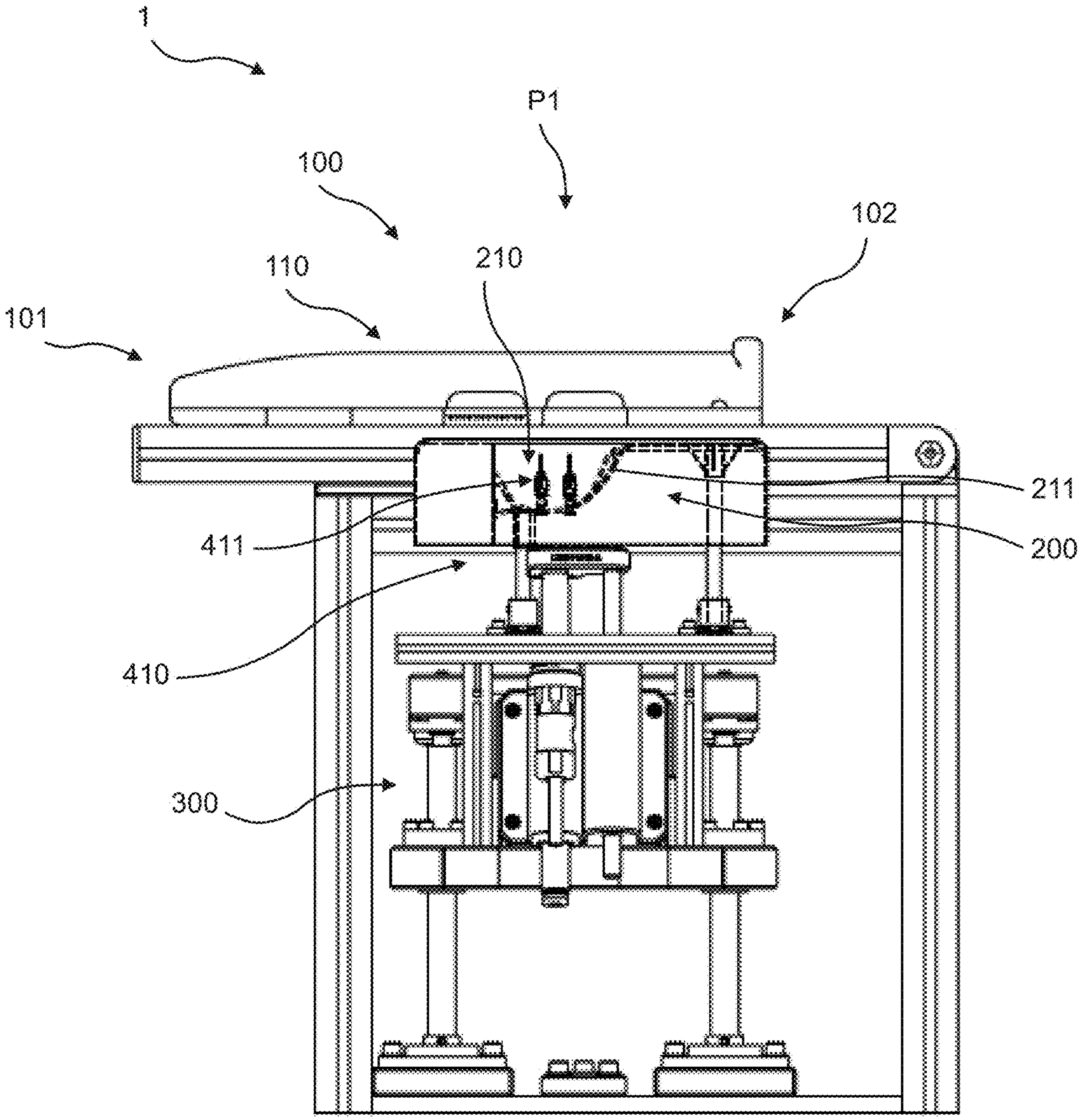
FIG. 6 is a side view of the handling device according to FIG. 1 in the functional position with the functional devices extended.
Figure 7:
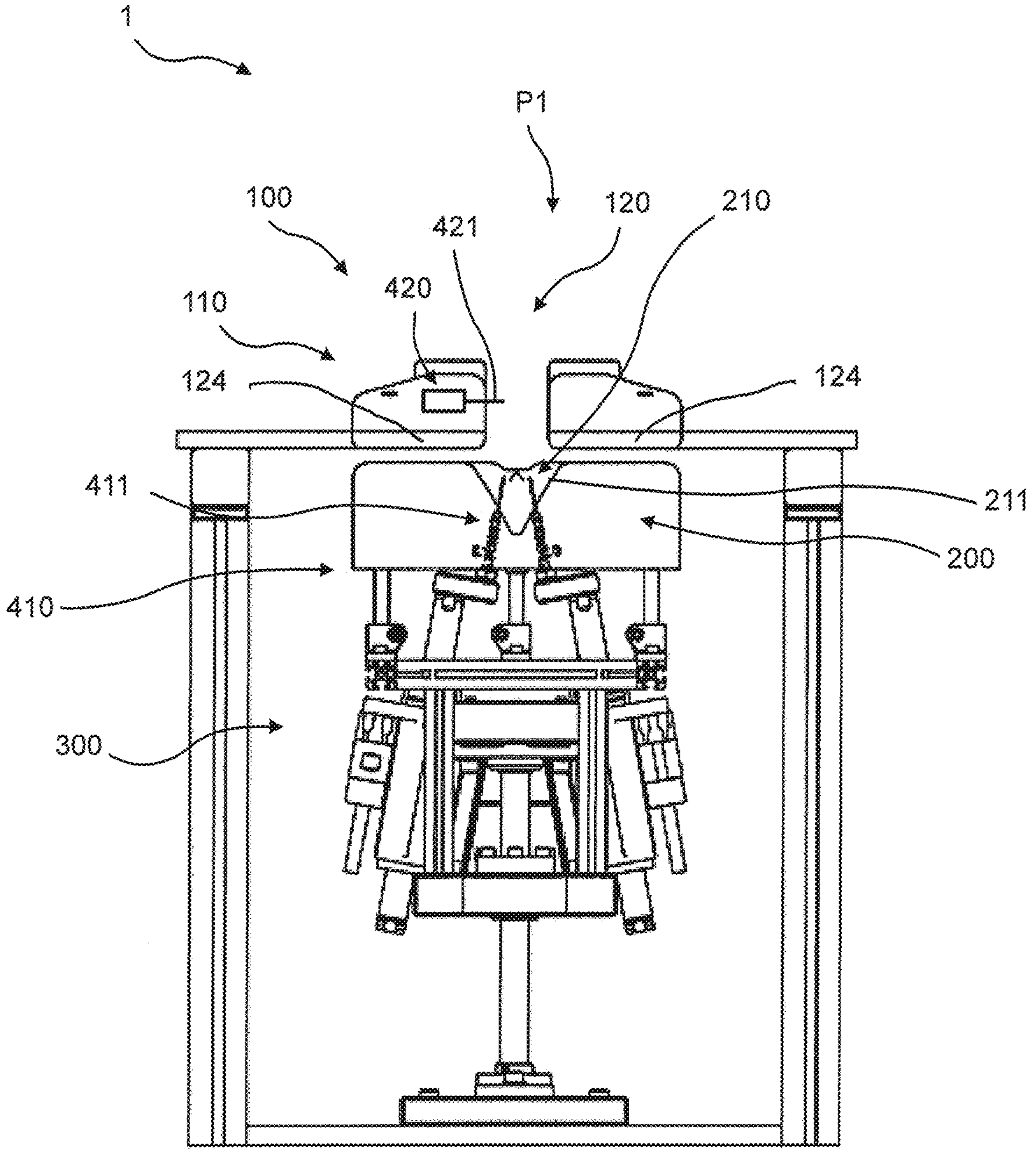
FIG. 7 is a front view of the handling device according to FIG. 1 in the functional position with the functional devices extended.
Figure 8:
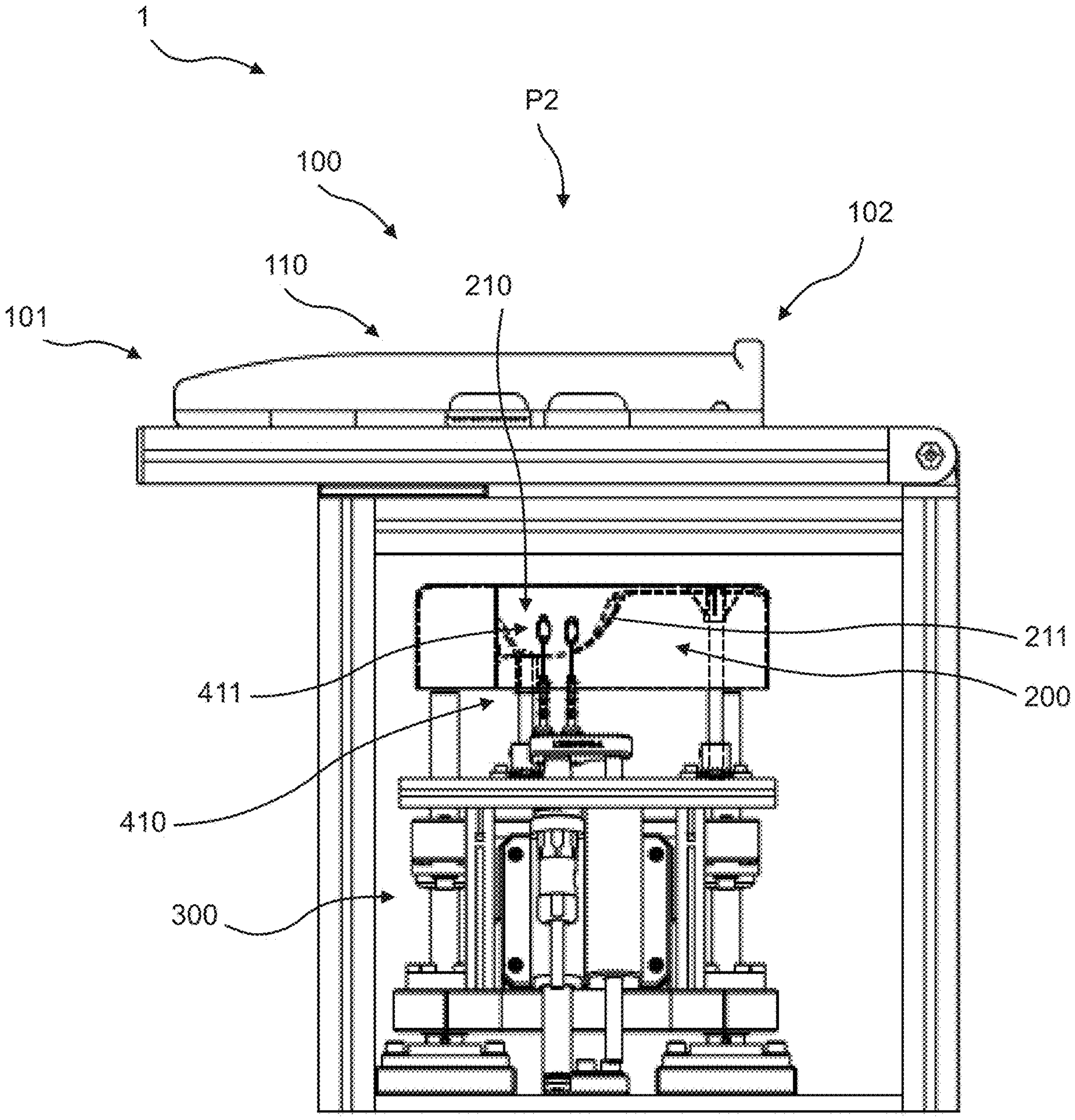
FIG. 8 is a side view of the handling device according to FIG. 1 in a release position.
Figure 9:
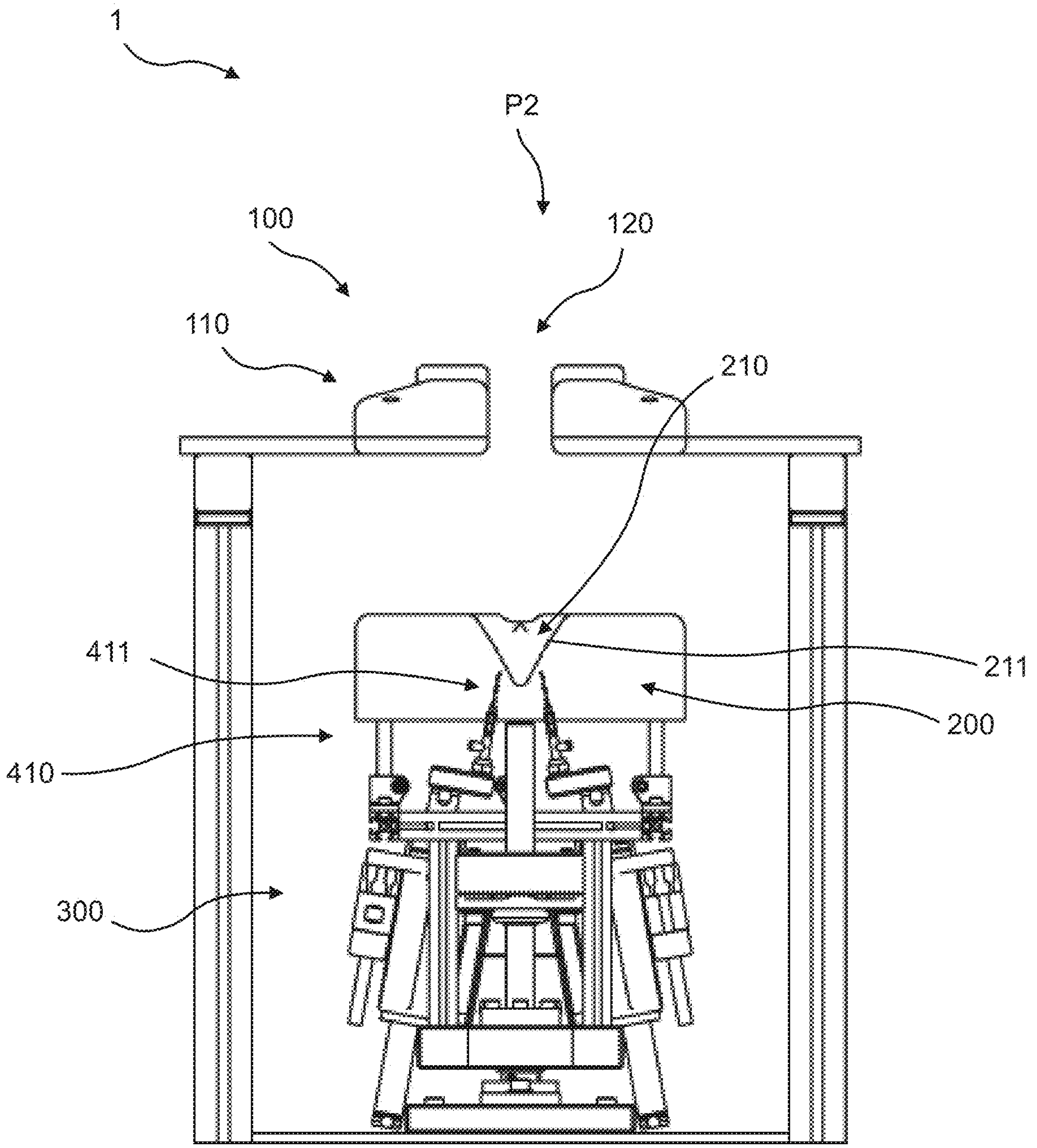
FIG. 9 is a front view of the handling device according to FIG. 1 in the release position.
Figure 10:
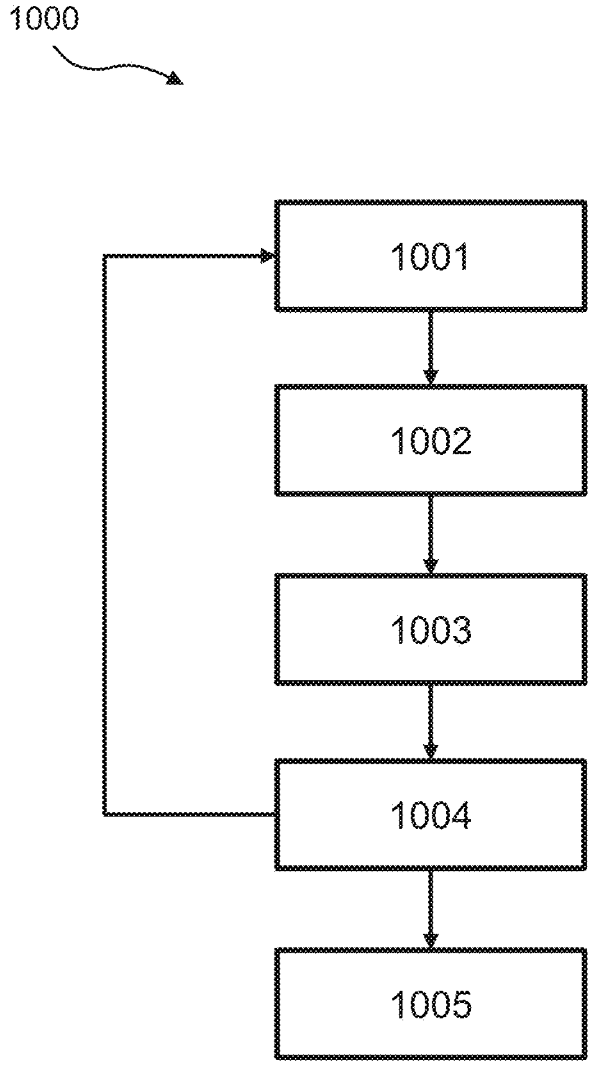
FIG. 10 is a schematic representation of an exemplary method for, in particular manual, handling of poultry animals.

FIG. 1 shows a schematic three-dimensional representation of an exemplary handling device 1. FIGS. 2 and 3 show the handling device according to FIG. 1 in the insertion position P0, FIGS. 4 and 5 show the handling device according to FIG. 1 in the functional position P1 with the functional devices 410, 420 retracted, FIGS. 6 and 7 show the handling device according to FIG. 1 in the functional position P1 with the functional devices 410, 420 extended, and FIGS. 8 and 9 show the handling device according to FIG. 1 in the release position P2. FIG. 10 shows a schematic representation of an exemplary method for, in particular manual, handling of poultry animals.

In the Figures, identical or essentially functionally identical elements are marked with the same reference numerals. General descriptions generally refer to all embodiments, unless differences are explicitly stated.

Handling device 1 comprises a guide rail 100 extending between a first end 101 and a second end 102 with two guide legs 110 and a poultry animal support 200 for placing the breast area of a poultry animal thereon.

The guide rail 100 is essentially horizontal and the two guide legs 110 are arranged opposite each other. A poultry animal holder 120 is formed between the two guide legs 110. The guide legs 110 are widened and/or flattened and rounded at a first end 101 of the guide rail 100. A flexible hold-down device 124 may be arranged between the guide legs and/or in the poultry animal holder, as shown in FIGS. 3, 5, and 7.

The handling device 1 is free of transport devices for the, in particular fully or partially automatic, transport of poultry animals through the handling device 1, in particular from the first end 101 to the second end 102 and/or into the handling device 1 and/or out of the handling device 1.

A user grasps a poultry animal and the wings and inserts it between the guide legs 110 from the first end 101 into the handling device 1, so that the breast area of the poultry animal comes to rest in a recess 210 on the ergonomically shaped poultry animal support 200. The poultry animal is inserted until the user's hand reaches the stop 301 at the second end 102 of the guide rails 110 and the breastbone of the poultry animal rests against the breast stop 211.

The poultry animal support 200 is arranged to be movable in the vertical direction, in particular exclusively in the vertical direction, relative to the guide rail 100. The handling device 1 also has an activation mechanism 300, which is designed to change a distance between the guide rail 100 and the poultry animal support 200, in particular in the vertical direction. The activation mechanism 300 is in particular designed to initiate a sequence of distance changes between the guide rail 100 and the poultry animal support 200.

The activation mechanism 300 is designed to reduce the distance between the guide rail 100 and the poultry animal support 200 from an insertion position P0 (shown in FIGS. 2 and 3) to a functional position P1 (shown in FIGS. 4 to 7) and then to increase it to a release position P2 (shown in FIGS. 8 and 9). Since the distance in the release position P2 is greater than in the insertion position P0, the activation mechanism 300 can reduce the distance from the release position P2 back to the insertion position P0 after the poultry animal has been released to make the handling device 1 ready for the insertion of the next poultry animal.

The activation mechanism 300 has a sensor 302 and is designed to initiate the increase and/or decrease of the distance between the guide rail 100 and the poultry animal support 200 in dependence of the sensor signal. The sensor 302 is preferably arranged and designed to detect the position of a user's hand at the stop 301 and/or the position of a poultry animal at the breast stop 211 and preferably then to generate a sensor signal, in particular to reduce the distance between the guide rail 100 and the poultry animal support 200 from an insertion position P0 to the functional position P1.

The handling device 1 further comprises a first functional device 410 and preferably a second functional device 420. Furthermore, the handling device 1 may comprise a substance provision device, which may in particular be configured to provide one or more substances to the first functional device 410 and/or a second functional device 420.

The activation mechanism 300 is preferably designed, in particular in dependence of the sensor signal, not only to initiate the at least one change in distance between the guide rail 100 and the poultry animal support 200, but also to activate at least the first functional device 410.

The first functional device 410 comprises a height-adjustable needle arrangement 411, which comprises two needle generators, each for one, two, or more needles. The needle generators are preferably arranged symmetrically to a longitudinal axis and arranged at an angle to the vertical.

The second functional device 420 has a substantially horizontally arranged needle 421, wherein the needle 421 is arranged on the guide rail 100, in particular on one of the two guide legs 110. The needle 421 is arranged to puncture the skin of a poultry animal placed on poultry animal support 200, in particular in the area of the inside of the wing.

The first functional device 410 and/or the second functional device 420 and/or the substance provision device is/are preferably designed as a modular exchange unit, in particular a disposable unit. This has the advantage that after vaccination of a (partial) population of poultry animals these units can be exchanged in order to meet hygiene, safety, and health requirements and in particular to counteract the spread of diseases.

The handling device 1 further comprises a mobile chassis 20 with four rollers 21. The poultry animal support 200 as well as the first functional device 410 to be described and the activation mechanism 300 also to be described are arranged within the chassis, in particular laterally within the chassis and not protruding laterally.

The handling device 1 is preferably used in the exemplary method 1000 shown schematically in FIG. 10 for, in particular manual, handling of poultry animals. For this purpose, in a first step 1001, a poultry animal is inserted in the insertion position P0 of the handling device 1 between two guide legs 110 of the guide rail 100 and the breast region of the poultry animal is placed on a poultry animal support 200. When the user's hand reaches the stop 301 and/or when the poultry animal reaches the breastbone stop 211, the sensor 302 sends a signal in step 1002 and the activation mechanism 300 reduces the distance between the guide rail 100 and the poultry animal support 200 from the insertion position P0 to the functional position P1 and preferably also activates the first and second functional devices 410, 420.

Subsequently, in step 1003, the distance between the guide rail 100 and the poultry animal support 200 is increased from the functional position P1 to the release position P2 by means of the activation mechanism 300 and the poultry animal is released.

Subsequently, in step 1004, the distance between the guide rail 100 and the poultry animal support 200 is reduced from the release position P2 back to the insertion position P0 by means of the activation mechanism 300 and the handling device 1 is ready for the insertion of the next poultry animal in a repetition of step 1001. To trigger step 1004, a light barrier can preferably be used as a sensor.

After handling a plurality of poultry animals, in particular a poultry house population or a poultry house subpopulation, the first functional device 410 and/or the second functional device 420 and/or the substance provision device(s) can be exchanged in a step 1005, preferably as a modular exchange unit, in particular disposable unit(s).

Figure 11:
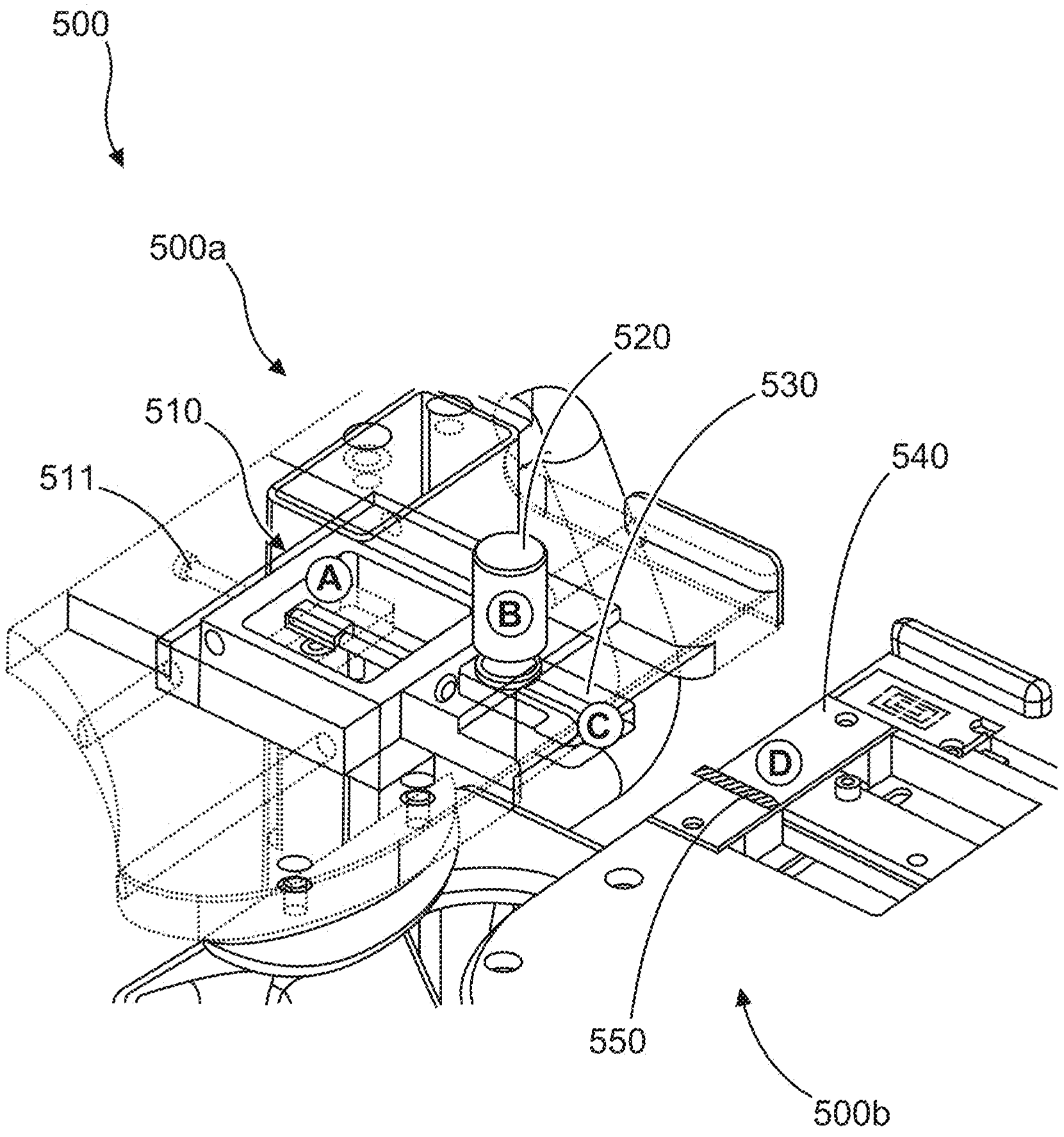
FIG. 11 is a schematic representation of a set-up for a wing vaccination.

FIG. 11 shows a structure 500 for the handling device for poultry animals as described here. The structure 500 can in particular be integrated into the handling device and/or arranged next to the handling device. The structure 500 is a structure for a wing vaccination, for example a smallpox vaccination. The structure 500 for a wing vaccination comprises two sections, namely a first section 500*a* and a second section 500*b*. The first section 500*a* of the structure 500 has a drive mechanism 510 which is designed to move a needle forwards and backwards, in particular within a horizontally aligned plane. Such a needle can be pushed from behind into a tube 511 of the mechanism and locked to it. The tube 511 is preferably moved by a crank drive and is preferably sealed towards the outside so that dirt can be prevented from entering the drive mechanism 510. A cartridge 530, preferably made of plastic, can be attached to the drive mechanism 510, to which a vaccine 520 can then be attached. The vaccine 520 is additionally removed from the operator's hand area by this cartridge 530, so that improved operator safety can be achieved. The vaccine 520 flows within the cartridge 530 via a channel to the tip of a needle and wets it. Preferably, on the opposite side of the needle, a further tube 550 arranged in the region of the section 540 can be extended, wherein this further tube 550 can form a counter-pressure point to the needle so that the wing skin of the poultry animal can be pierced more easily. The entire structure 500 of the wing vaccination can preferably be moved along the direction of insertion of the poultry animal. In this way, the needle position can be adapted to the anatomy of the individual poultry animal in a particularly preferred manner.

The invention claimed is:

1. A handling device for poultry animals for assisting manual handling of poultry animals, comprising:

a guide rail extending between a first end and a second end, with two guide legs; and a poultry animal support for placing the breast area of a poultry animal thereon;

wherein a distance between the guide rail and the poultry animal support may be increased from a functional position to a release position in the vertical direction by means of an activation mechanism;

wherein when the poultry animal is inserted between the two guide legs of the guide rail, the distance between the guide rail and the poultry animal support corresponds to an insertion position, and the distance between the guide rail and the poultry animal support is reduced from the insertion position to the functional position after the poultry animal has been inserted in dependence of a sensor signal; and wherein at least a first functional device and/or a second functional device is actuated before the distance between the guide rail and the poultry animal support is increased from the functional position to the release position.

2. The handling device according to claim 1, wherein the handling device is free of transport devices for the fully or partially automatic transport of poultry animals through the handling device from the first end to the second end, into the handling device, and/or out of the handling device.

3. The handling device according to claim 1, wherein an activation mechanism is adapted to initiate a sequence of distance changes between the guide rail and the poultry animal support in dependence of a sensor signal.

4. The handling device according to claim 3, wherein:

the activation mechanism is adapted to increase a distance between the guide rail and the poultry animal support from a functional position to a release position in the vertical direction; and the activation mechanism has a sensor and is adapted to initiate the increase and/or decrease of the distance between the guide rail and the poultry animal support in dependence of the sensor signal.

5. The handling device according to claim 3, wherein:

the activation mechanism is adapted to reduce a distance between the guide rail and the poultry animal support from an insertion position to the functional position; and/or the activation mechanism is adapted to reduce the distance between the guide rail and the poultry animal support from a release position to the functional position and/or to the insertion position.

6. The handling device according to claim 3, wherein the handling device has a first functional device and a second functional device.

7. The handling device according to claim 6, wherein the activation mechanism is adapted in dependence of the sensor signal to initiate at least one change in distance between the guide rail and the poultry animal support and to activate at least the first and/or the second functional device.

8. The handling device according to claim 6, wherein:

the handling device, the first functional device, and/or the second functional device comprise a substance provision device; and the first functional device, second functional device, and/or the substance provision device comprise a modular exchange unit.

9. The handling device according to claim 8, wherein the modular exchange unit comprises a disposable unit.

10. The handling device according to claim 6, wherein the first functional device comprises a needle arrangement that is adjustable in height and comprises at least two needle generators comprising one, two, or more needles, the needle generators being arranged symmetrically with respect to a longitudinal axis and/or being arranged at an angle between 15 degrees and 25 degrees with respect to the vertical and/or a vertical plane encompassing the longitudinal axis.

11. The handling device according to claim 6, wherein:

the second functional device has a needle which is arranged essentially horizontally, the needle being arranged on one of the two guide legs; and/or the needle of the second functional device is arranged to puncture the skin of a poultry animal placed on the poultry animal support in the region of the inside of the wing; and/or the needle of the second functional device is arranged above a flexible hold-down device.

12. The handling device according to claim 1, wherein:

a distance between the first end and the second end is at most 1.50 m;

a base area of the handling device is 1.80 m×1.00 m; and/or a vertical height of the handling device off a supporting surface and measured at the first end and/or of the second end is at least 0.60 m and at most 1.20 m.

13. The handling device according to claim 1, wherein:

the guide rail is aligned essentially horizontally; or the two guide legs are arranged opposite one another;

a poultry animal holder is formed between the two guide legs;

the poultry animal support is shaped to be ergonomic for poultry animals, has a recess therein, and/or has a breast stop;

the poultry animal support is arranged so as to be movable relative to the guide rail, wherein the poultry animal support is arranged so as to be movable exclusively in the vertical direction relative to the guide rail;

the guide legs are widened, flattened, and/or rounded at a first end of the guide rail;

the guide legs have a stop at a second end of the guide rail;

a flexible hold-down device is arranged between the guide legs and/or in the poultry animal holder;

the handling device has a mobile chassis, and further comprises a chassis with rollers; and/or a structure is provided for a wing vaccination, which has a drive mechanism which is designed to move a needle forwards and backwards, in particular within a horizontally aligned plane.

14. A method for handling of poultry animals in a handling device comprising:

a guide rail extending between a first end and a second end, with two guide legs; and a poultry animal support for placing the breast area of a poultry animal thereon;

the method comprising the steps of:

inserting a poultry animal between the two guide legs of the guide rail and placing the breast area of the poultry animal on a poultry animal support; and increasing a distance between the guide rail and the poultry animal support from a functional position to a release position in the vertical direction by means of an activation mechanism;

wherein when the poultry animal is inserted between two guide legs of the guide rail, the distance between the guide rail and the poultry animal support corresponds to an insertion position, and the distance between the guide rail and the poultry animal support is reduced from the insertion position to a functional position after the poultry animal has been inserted in dependence of a sensor signal;

wherein the method further comprises the step of activating at least a first functional device and/or a second functional device before the distance between the guide rail and the poultry animal support is increased from the functional position to the release position.

15. The method of claim 14, further comprising the step of exchanging the first functional device, the second functional device, and/or a substance provision device after handling a plurality of poultry animals treated in a poultry house population or a poultry house subpopulation as a modular exchange unit.

16. The method of claim 15, wherein the modular exchange unit comprises a disposable unit.

17. Use of a handling device, the device comprising a handling device for poultry animals for assisting manual handling of poultry animals, comprising:

a guide rail extending between a first end and a second end, with two guide legs; and a poultry animal support for placing the breast area of a poultry animal thereon for handling poultry animals, in or in front of a poultry house and/or in a method according to claim 15.

18. A method for handling of poultry animals in a handling device comprising:

a guide rail extending between a first end and a second end, with two guide legs; and a poultry animal support for placing the breast area of a poultry animal thereon;

the method comprising the steps of:

inserting a poultry animal between the two guide legs of the guide rail and placing the breast area of the poultry animal on a poultry animal support, wherein when the poultry animal is inserted between two guide legs of the guide rail, the distance between the guide rail and the poultry animal support corresponds to an insertion position, and the distance between the guide rail and the poultry animal support is reduced from the insertion position to a functional position after the poultry animal has been inserted in dependence of a sensor signal; and increasing a distance between the guide rail and the poultry animal support from a functional position to a release position in the vertical direction by means of an activation mechanism; and activating at least a first functional device and/or a second functional device before the distance between the guide rail and the poultry animal support is increased from the functional position to the release position.

* * * * *